US012701494B2

(12) United States Patent
    Agcaoili et al.

(10) Patent No.:  US 12,701,494 B2
(45) Date of Patent:      Aug. 4, 2026

(54) RESTRICTING USER EQUIPMENT ACCESS BASED ON CELL SITE TECHNICAL ACCESS CATEGORIES

(71) Applicant: Boost SubscriberCo L.L.C., Englewood, CO (US)

(72) Inventors: Arnold Agcaoili, Littleton, CO (US); Dawood Shahdad, Englewood, CO (US); Sandeep Kulkarni, Englewood, CO (US); Robert Urbanek, Overland Park, KS (US); Jeffrey Wendeborn, Englewood, CO (US)

(73) Assignee: Boost SubscriberCo L.L.C., Englewood, CO (US)

( * ) Notice: Subject to any disclaimer, the term of this patent is extended or adjusted under 35 U.S.C. 154(b) by 274 days.

(21) Appl. No.: 18/232,207

(22) Filed: Aug. 9, 2023

(65)            Prior Publication Data
    US 2024/0121699 A1      Apr. 11, 2024

Related U.S. Application Data

(60) Provisional application No. 63/413,914, filed on Oct. 6, 2022.

(51) Int. Cl.
    *H04W 48/02*        (2009.01)
    *H04W 48/16*        (2009.01)

(52) U.S. Cl.
    CPC ........... *H04W 48/02* (2013.01); *H04W 48/16* (2013.01)

(58) Field of Classification Search
    CPC ............................. H04W 48/02; H04W 48/16
    See application file for complete search history.

(56)                References Cited

U.S. PATENT DOCUMENTS

2010/0205215 A1*   8/2010  Cook ................... G06F 16/9566
                                                    707/E17.108

* cited by examiner

*Primary Examiner* — Diane D Mizrahi
(74) *Attorney, Agent, or Firm* — Jeremiah J. Baunach; Frontier IP Law PLLC

(57)                ABSTRACT

A system of a wireless telecommunication network may categorize each cell site of a plurality of cell sites in the network into at least one respective technical access category (TAC) of a plurality of TACs. The plurality of TACs may include one or more TACs indicating one or more characteristics of a portion of a network provided by a cell site. For each user equipment device (UE) of a plurality of UEs, the system restricts access of the UE to particular cell sites of the network based on respective TACs of the particular cell sites. The restricting access of the UE to particular cell sites may also be based on characteristics of the UE or a subscriber associated with the UE.

17 Claims, 13 Drawing Sheets

200

| UEs category | | Vendor B RAN | Vendor B Unlaunched RAN | NOTES |
|---|---|---|---|---|
| | | TAC Set 5 | TAC Set 6 | |
| Vendor A Shared AM Data Profile 1 | Vendor A Engineering test UEs | Not Allowed | Not Allowed | |
| Vendor A Shared AM Data Profile 2 | Vendor A DSDS and data commercial UEs | Not Allowed | Not Allowed | |
| Vendor A Shared AM Data Profile 3 | Vendor A VoNR commercial subscriber UEs | Not Allowed | Not Allowed | |
| Vendor B Shared AM Data Profile 4 | Vendor B Engineering test UEs | Allowed | Allowed | (Vendor B RAN) Currently device-type based restriction(dynamic) is not available in product/standards. If Device type(ex: Apple/Vendor B) is known during provisioning, restriction can be configured in profile |
| Vendor B Shared AM Data Profile 5 | Vendor B DSDS and data commercial UEs | Allowed | Not Allowed | |
| Vendor B Shared AM Data Profile 6 | Vendor B VoNR commercial subscriber UEs | Not Allowed | Not Allowed | |
| Universal Shared AM Data Profile 7 | Universal Engineering test UEs | Allowed | Allowed | |
| Universal Shared AM Data Profile 8 | Universal DSDS and data commercial UEs | Allowed | Not Allowed | |
| Universal Shared AM Data Profile 9 | Universal VoNR commercial subscriber UEs | Not Allowed | Not Allowed | |

| TAC Groups | Market | Vendor A | | | Vendor B | | |
|---|---|---|---|---|---|---|---|
| | | Pre-Commercial | Data | VoNR | Pre-Commercial | Data | VoNR |
| Group 1 | Test | Y | Y | Y | N | N | N |
| Group 1 | Data | N | Y | Y | N | N | N |
| Group 1 | VoNR | N | N | Y | N | N | N |
| Group 2 | Test | N | N | N | Y | Y | Y |
| Group 2 | Data | N | N | N | N | Y | Y |
| Group 2 | VoNR | Y | Y | Y | N | N | Y |
| Universal | Test | N | Y | Y | Y | Y | Y |
| Universal | Data | N | Y | Y | N | Y | Y |
| Universal | VoNR | N | Y | Y | N | N | Y |

100

200

| | UEs category | SUPI List | Vendor A VoNR RAN | Vendor A Data RAN (VoNR not ready) | Vendor A Unlaunched RAN | Vendor B VoNR RAN |
|---|---|---|---|---|---|---|
| | | | TAC Set 1 | TAC Set 2 | TAC Set 3 | TAC Set 4 |
| Vendor A Shared AM Data Profile 1 | Vendor A Engineering test UEs | SUPI List 1 | Allowed | Allowed | Allowed | Not Allowed |
| Vendor A Shared AM Data Profile 2 | Vendor A DSDS and data commercial UEs | SUPI List 2 | Allowed | Allowed | Not Allowed | Not Allowed |
| Vendor A Shared AM Data Profile 3 | Vendor A VoNR commercial subscriber UEs | SUPI List 3 | Allowed | Not Allowed | Not Allowed | Not Allowed |
| Vendor B Shared AM Data Profile 4 | Vendor B Engineering test UEs | SUPI List 4 | Not Allowed | Not Allowed | Not Allowed | Allowed |
| Vendor B Shared AM Data Profile 5 | Vendor B DSDS and data commercial UEs | SUPI List 5 | Not Allowed | Not Allowed | Not Allowed | Allowed |
| Vendor B Shared AM Data Profile 6 | Vendor B VoNR commercial subscriber UEs | SUPI List 6 | Not Allowed | Not Allowed | Not Allowed | Allowed |
| Universal Shared AM Data Profile 7 | Universal Engineering test UEs | SUPI List 7 | Allowed | Allowed | Allowed | Allowed |
| Universal Shared AM Data Profile 8 | Universal DSDS and data commercial UEs | SUPI List 8 | Allowed | Allowed | Not Allowed | Allowed |
| Universal Shared AM Data Profile 9 | Universal VoNR commercial subscriber UEs | SUPI List 9 | Allowed | Not Allowed | Not Allowed | Allowed |

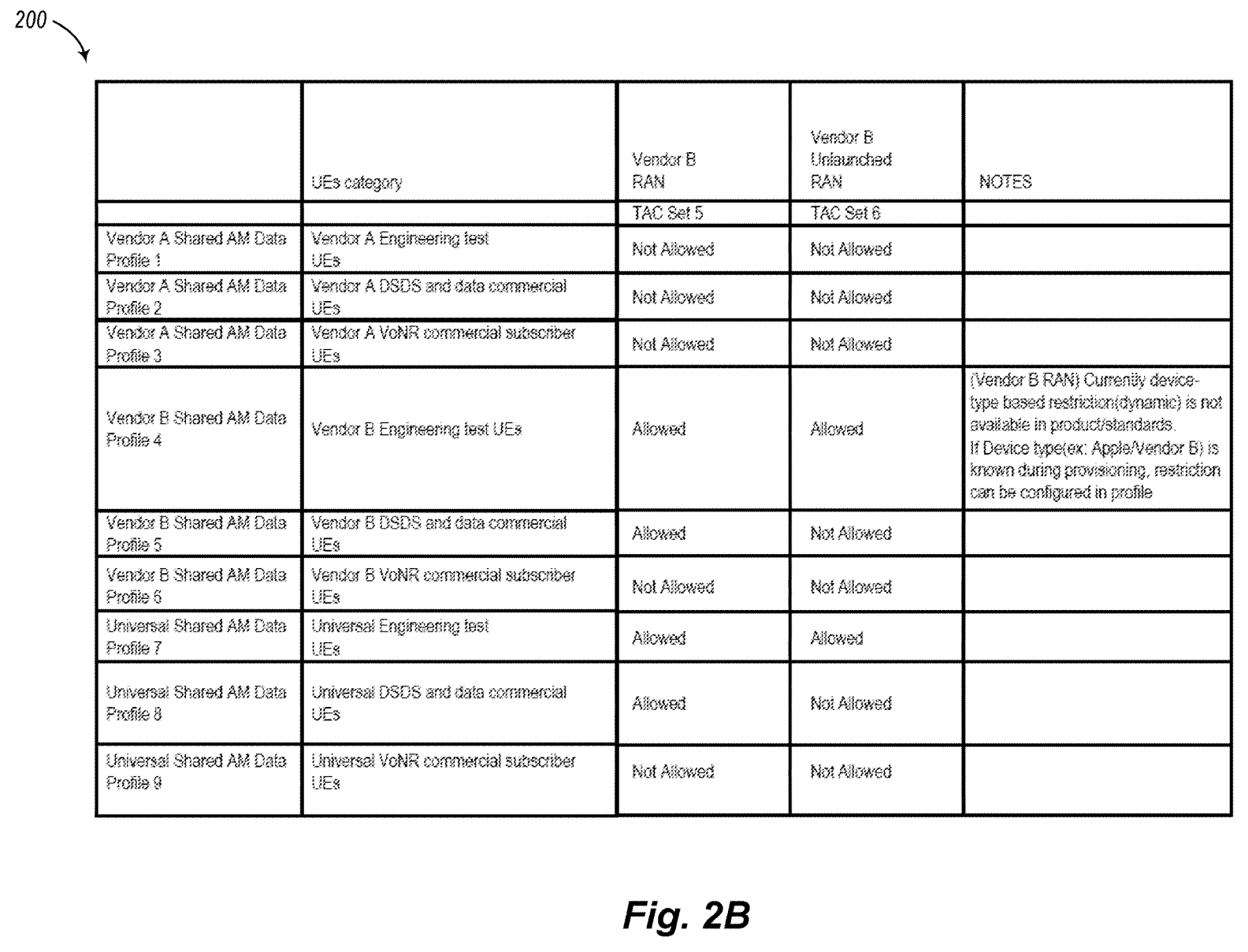

| | UEs category | Vendor B RAN TAC Set 5 | Vendor B Unlaunched RAN TAC Set 6 | NOTES |
|---|---|---|---|---|
| Vendor A Shared AM Data Profile 1 | Vendor A Engineering test UEs | Not Allowed | Not Allowed | |
| Vendor A Shared AM Data Profile 2 | Vendor A DSDS and data commercial UEs | Not Allowed | Not Allowed | |
| Vendor A Shared AM Data Profile 3 | Vendor A VoNR commercial subscriber UEs | Not Allowed | Not Allowed | |
| Vendor B Shared AM Data Profile 4 | Vendor B Engineering test UEs | Allowed | Allowed | (Vendor B RAN) Currently, device-type based restriction(dynamic) is not available in product/standards. If Device type:ex. Apple/Vendor B) is known during provisioning, restriction can be configured in profile |
| Vendor B Shared AM Data Profile 5 | Vendor B DSDS and data commercial UEs | Allowed | Not Allowed | |
| Vendor B Shared AM Data Profile 6 | Vendor B VoNR commercial subscriber UEs | Not Allowed | Not Allowed | |
| Universal Shared AM Data Profile 7 | Universal Engineering test UEs | Allowed | Allowed | |
| Universal Shared AM Data Profile 8 | Universal DSDS and data commercial UEs | Allowed | Not Allowed | |
| Universal Shared AM Data Profile 9 | Universal VoNR commercial subscriber UEs | Not Allowed | Not Allowed | |

*Fig. 2B*

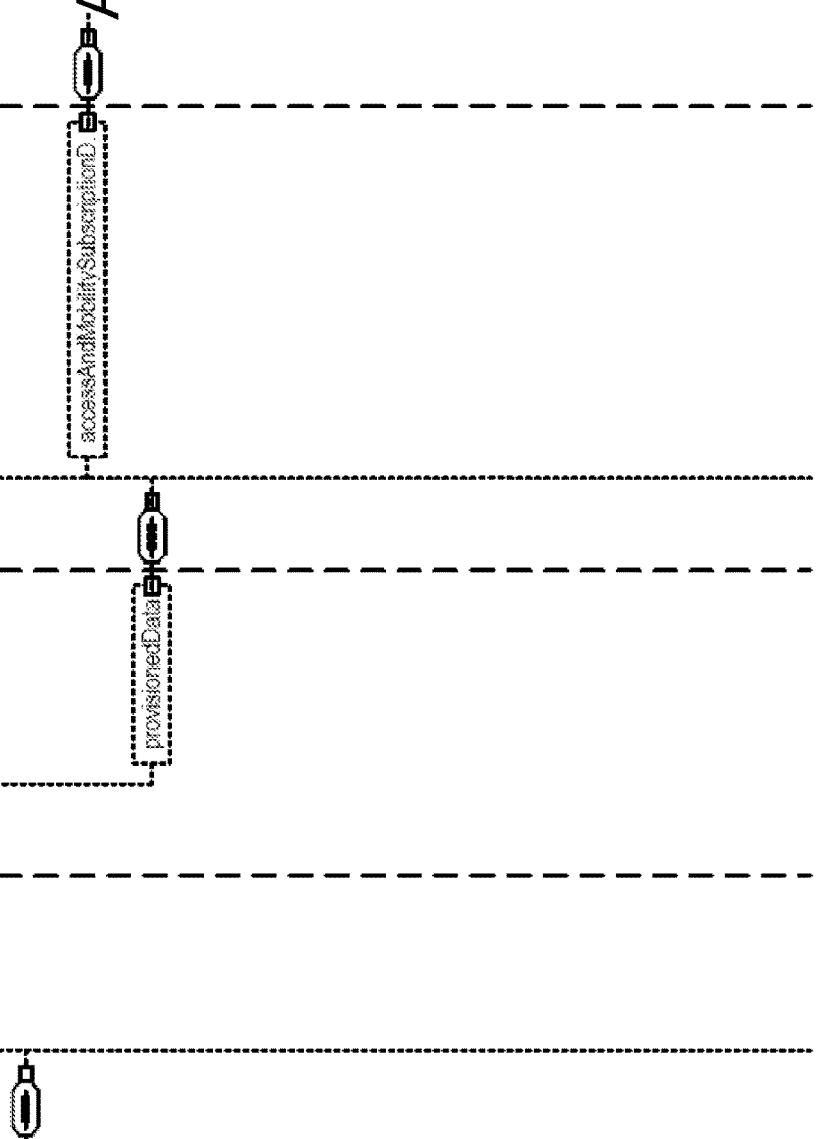
*Fig. 3A*

300

400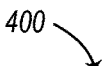

| | supportedFeatures |
| | genPublicSubscriptionIds |
| | internalGroupIds |
| | accessRestr |
| | coreNetworkTypeRestriction |
| | rtspIndex |
| | micoAllowed |
| | subsRegTimer |
| | ueUsageType |
| | localAreaDataNtwInfo |
| | mpsPriority |
| | activeTime |
| | downLinkPktCount |
| | nssai |
| | serviceAreaRestriction |
| | forbiddenAreas |
| | mcsPriority |
| | odbPacketServices |
| | subscribedDnnList |
| | ueAmbr |
| | primaryRatRestrictions |
| | secondaryRatRestrictions |
| | nssaiInclusionAllowed |

SharedAmData
- identifier
- accessAndMobilitySubscriptionData

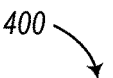

400

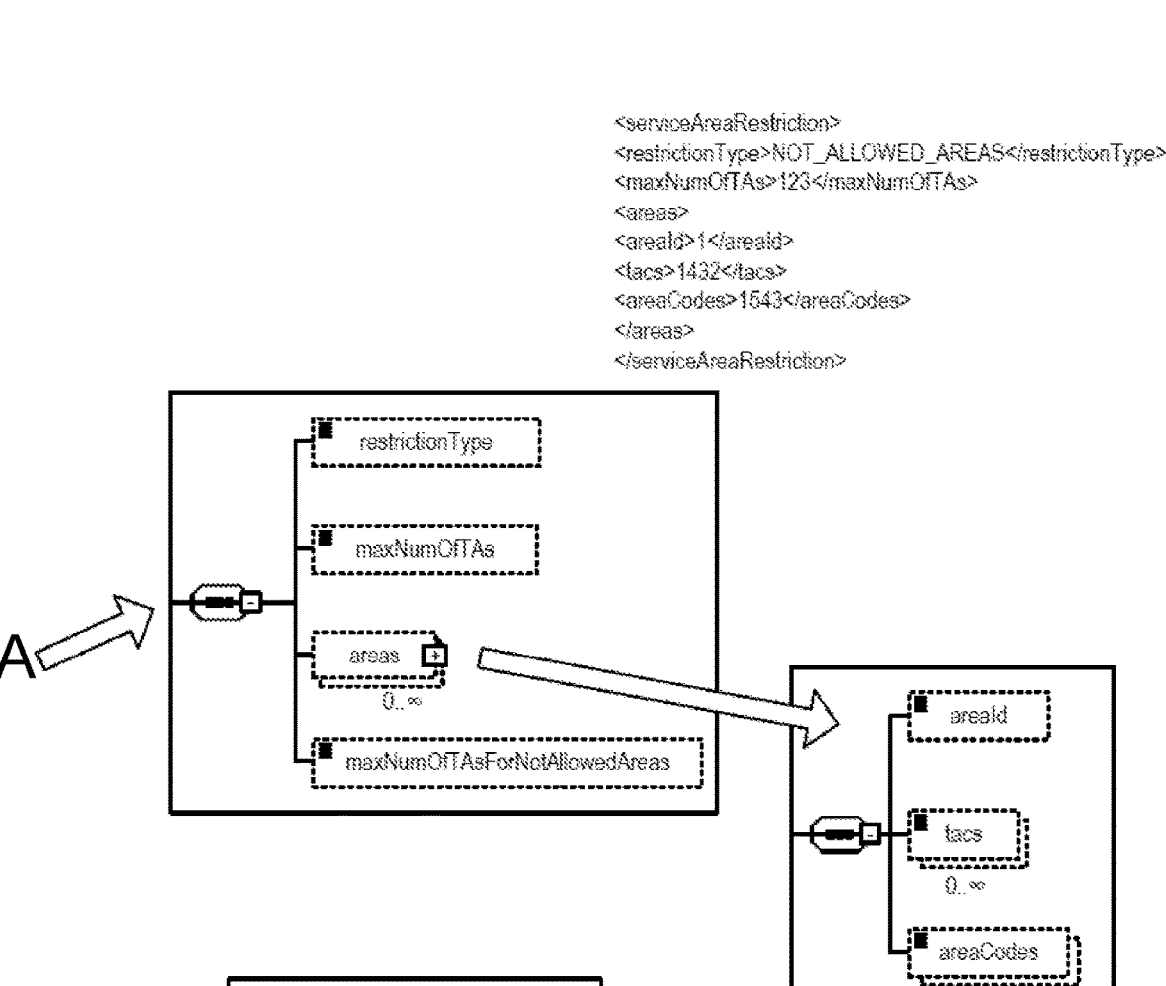

<serviceAreaRestriction>
<restrictionType>NOT_ALLOWED_AREAS</restrictionType>
<maxNumOfTAs>123</maxNumOfTAs>
<areas>
<areaId>1</areaId>
<tacs>1432</tacs>
<areaCodes>1543</areaCodes>
</areas>
</serviceAreaRestriction>

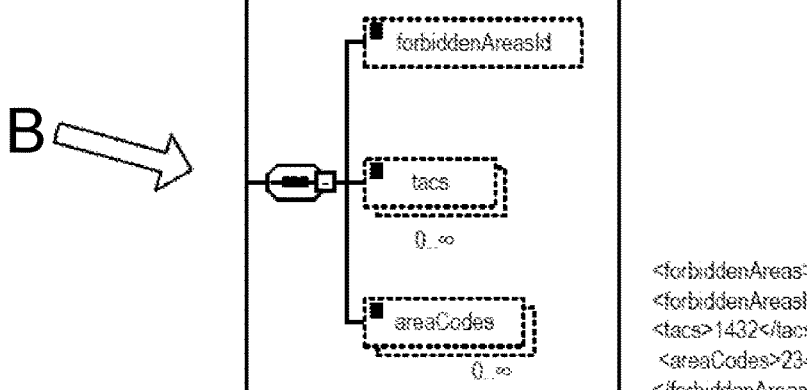

<forbiddenAreas>
<forbiddenAreasId>1</forbiddenAreasId>
<tacs>1432</tacs>
<areaCodes>234</areaCodes>
</forbiddenAreas>

*Fig. 4B*

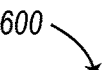
600
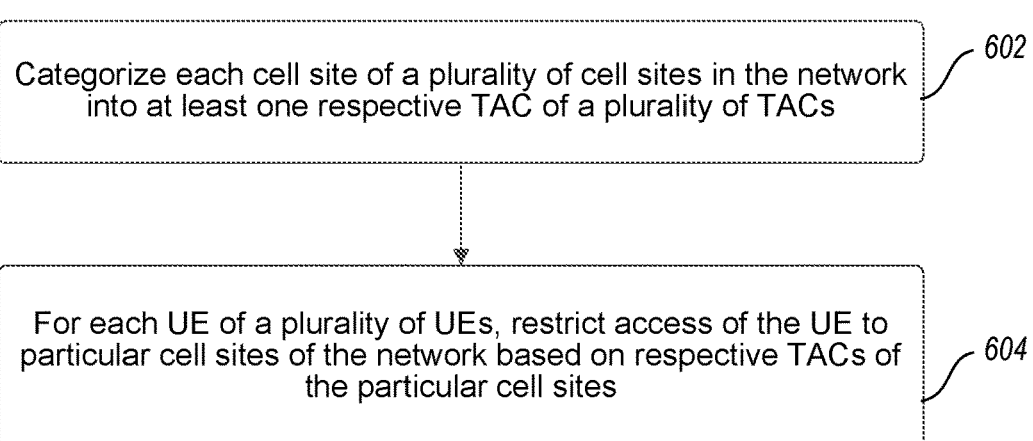
Categorize each cell site of a plurality of cell sites in the network into at least one respective TAC of a plurality of TACs    602
For each UE of a plurality of UEs, restrict access of the UE to particular cell sites of the network based on respective TACs of the particular cell sites    604
*Fig. 6*

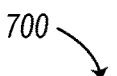
700
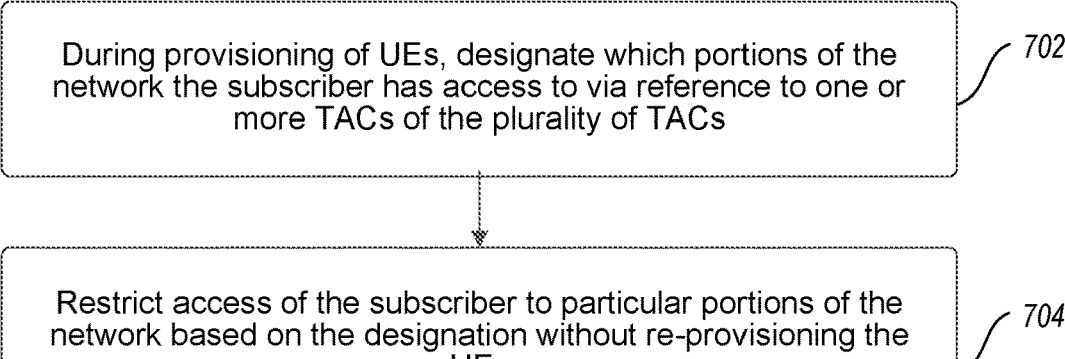
During provisioning of UEs, designate which portions of the network the subscriber has access to via reference to one or more TACs of the plurality of TACs     702
Restrict access of the subscriber to particular portions of the network based on the designation without re-provisioning the UEs     704
*Fig. 7*

800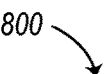
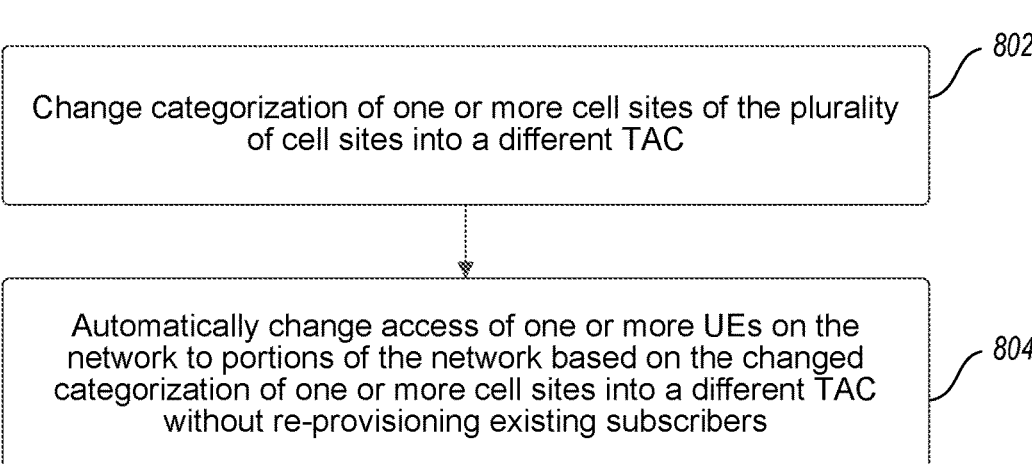
Change categorization of one or more cell sites of the plurality of cell sites into a different TAC
*802*
Automatically change access of one or more UEs on the network to portions of the network based on the changed categorization of one or more cell sites into a different TAC without re-provisioning existing subscribers
*804*
*Fig. 8*

RESTRICTING USER EQUIPMENT ACCESS BASED ON CELL SITE TECHNICAL ACCESS CATEGORIES

BRIEF SUMMARY

Briefly described, embodiments disclosed herein are directed to systems and methods for restricting UE access to certain cell sites in the network.

As a mobile network operator (MNO) of a wireless telecommunication network grows and matures its network, it is advantageous to have a capability to be able to differentiate different portions of the network. In various embodiments, one or more characteristics may be used to define technical access categories (TACs) for a portion of a network. Furthermore, as an MNO introduces network markets or new sites within an existing market, it is advantageous for the MNO to be able to designate these new sites as participating in the portions of the network that fall within certain TACs without any need to reprovision existing subscribers or provision new subscribers differently. For example, in various embodiments, during subscriber provisioning, the MNO is able to designate which portions of the network the subscriber should have access to via reference to such TACs.

In one example embodiment, the system categorize each cell site of a plurality of cell sites in the network into at least one respective technical access category (TAC) of a plurality of TACs. The plurality of TACs may include one or more TACs indicating one or more characteristics of a portion of a network provided by a cell site. For each user equipment device (UE) of a plurality of UEs, the system restricts access of the UE to particular cell sites of the network based on respective TACs of the particular cell sites. The restricting access of the UE to particular cell sites may also be based on characteristics of the UE or a subscriber associated with the UE.

In an example embodiment, the system may electronically categorize new cell sites in the network into a TAC without re-provisioning existing subscribers on the network and without provisioning new subscribers on the network differently than how subscribers were provisioned previously on the network other than designating which portions of the network the new subscribers have access to via reference to one or more TACs.

BRIEF DESCRIPTION OF THE SEVERAL VIEWS OF THE DRAWINGS

Non-limiting and non-exhaustive embodiments are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings:

FIGS. 2A and 2B show a chart illustrating identified shared data sets associated with categories of UEs with example use cases of which portions of the network those categories of UEs have access to according to a TAC designated for cell sites providing those portions of the network in accordance with embodiments described herein.

FIGS. 3A and 3B illustrate an example of how a subscriber profile update may work using shared data sets in an example implementation of restricting user UE access to certain cell sites in the network in accordance with embodiments described herein.

FIGS. 4A and 4B illustrate an example data structure for shared data indicating service area restriction and forbidden area for subscribers in an example implementation of restricting UE access to certain cell sites in the network in accordance with embodiments described herein.

FIG. 6 illustrates a logical flow diagram showing an example embodiment of a process for restricting UE access to certain cell sites in the network in accordance with embodiments described herein in accordance with embodiments described herein.

FIG. 7 illustrates a logical flow diagram showing an example embodiment of a process for restricting UE access to certain cell sites in the network involving designating which portions of the network the subscriber has access to in accordance with embodiments described herein in accordance with embodiments described herein.

FIG. 8 illustrates a logical flow diagram showing an example embodiment of a process for restricting UE access to certain cell sites involving in the network involving changing categorization of one or more cell sites of the plurality of cell sites into a different TAC in accordance with embodiments described herein in accordance with embodiments described herein.

DETAILED DESCRIPTION

Figure 1:
FIG. 1 is a chart illustrating an example list of technical access categories (TACs) organized into groups and indicating which user equipment (UE) devices have access to cell cites categorized into the listed TACs based on device use in accordance with embodiments described herein.

The following description, along with the accompanying drawings, sets forth certain specific details in order to provide a thorough understanding of various disclosed embodiments. However, one skilled in the relevant art will recognize that the disclosed embodiments may be practiced in various combinations, without one or more of these specific details, or with other methods, components, devices, materials, etc. In other instances, well-known structures or components that are associated with the environment of the present disclosure, including but not limited to the communication systems, computers and networks, have not been shown or described in order to avoid unnecessarily obscuring descriptions of the embodiments. Additionally, the various embodiments may be methods, systems, media, or devices. Accordingly, the various embodiments may be entirely hardware embodiments, entirely software embodiments, or embodiments combining software and hardware aspects.

Throughout the specification, claims, and drawings, the following terms take the meaning explicitly associated herein, unless the context clearly dictates otherwise. The term "herein" refers to the specification, claims, and drawings associated with the current application. The phrases "in one embodiment," "in another embodiment," "in various embodiments," "in some embodiments," "in other embodiments," and other variations thereof refer to one or more features, structures, functions, limitations, or characteristics of the present disclosure, and are not limited to the same or different embodiments unless the context clearly dictates otherwise. As used herein, the term "or" is an inclusive "or" operator, and is equivalent to the phrases "A or B, or both" or "A or B or C, or any combination thereof," and lists with additional elements are similarly treated. The term "based on" is not exclusive and allows for being based on additional features, functions, aspects, or limitations not described, unless the context clearly dictates otherwise. In addition, throughout the specification, the meaning of "a," "an," and "the" include singular and plural references.

Fifth generation (5G) wireless technology provides a broad range of wireless services delivered to the end user across multiple access platforms and multi-layer networks. 5G is a dynamic, coherent and flexible framework of multiple advanced technologies supporting a variety of applications. 5G utilizes an intelligent architecture, with Radio Access Networks (RANs) not constrained by base station proximity or complex infrastructure. 5G enables a disaggregated, flexible and virtualized RAN with interfaces creating additional data access points.

5G network functions may be completely software-based and designed as cloud-native, meaning that they're agnostic to the underlying cloud infrastructure, allowing higher deployment, agility and flexibility. With the advent of 5G, industry experts defined how the 5G core (5GC) network should evolve to support the needs of 5G New Radio (NR) and the advanced use cases enabled by it. The 3rd Generation Partnership Project (3GPP) develops protocols and standards for telecommunication technologies including RAN, core transport networks and service capabilities. 3GPP has provided complete system specifications for 5G network architecture which is much more service oriented than previous generations.

The 3GPP develops protocols for mobile telecommunications and has developed a standard for 5G. The 5G architecture is based on what is called a Service-Based Architecture (SBA), which implements IT network principles and a cloud-native design approach. In this architecture, each network function (NF) offers one or more services to other NFs via Application Programming Interfaces (API). Network function virtualization (NFV) decouples software from hardware by replacing various network functions such as firewalls, load balancers and routers with virtualized instances running as software. This eliminates the need to invest in many expensive hardware elements and can also accelerate installation times, thereby providing revenue generating services to the customer faster.

5G Core (5GC) is the heart of a 5G mobile network. It establishes reliable, secure connectivity to the network for end users and provides access to its services. The core domain handles a wide variety of essential functions in the mobile network, such as connectivity of new user equipment (UE) and mobility management, authentication and authorization, subscriber data management and policy management, among others. 5G Core network functions are completely software-based and designed as cloud-native, meaning that they're agnostic to the underlying cloud infrastructure, allowing higher deployment agility and flexibility.

With the advent of 5G, industry experts defined how the core network should evolve to support the needs of 5G New Radio (NR) and the advanced use cases enabled by it. Together, they developed the 3rd Generation Partnership Project (3GPP) standard for core networks known as 5G Core (5GC).

The 5GC architecture is based on what is called a Service-Based Architecture (SBA), which implements IT network principles and a cloud-native design approach. In this architecture, each network function (NF) offers one or more services to other NFs via Application Programming Interfaces (API). Each NF, such as the user plane function (UPF) and the Session Management Function (SMF) is formed by a combination of small pieces of software code called as microservices. Some microservices can even be re-used for different NFs, making implementation more effective and facilitating independent life-cycle management—which allows upgrades and new functionalities to be deployed with zero impact on running services.

Decoupling other control plane functions from the user plane, together with the 5G Core Access and Mobility Management Function (AMF), the SMF performs the role of Dynamic Host Control Protocol (DHCP) server and Internet Protocol (IP) Address Management (IPAM) system. The SMF sets configuration parameters in the UPF that define traffic steering parameters and ensure the appropriate routing of packets while guaranteeing the delivery of incoming packets, though a Downlink (DL) data notification.

The AMF supports the termination of Non Access Stratum (NAS) signaling, NAS ciphering & integrity protection, registration management, connection management, mobility management, access authentication and authorization, and security context management. The Unified Data Management network function (UDM) supports different major functionalities in 5G. The USM manages network user data in a single, centralized element. It generates authentication credentials used during the authentication process. It authorizes network access and roaming based on user subscriptions. It can be paired with the user data repository (UDR) which stores the user data such as customer profile information, customer authentication information, and encryption keys for the information. UDM resides on the control plane and utilizes microservices to communicate between the user plane and the control plane.

The UDM manages data for access authorization, subscriber registration, and data network profiles. Subscriber data is provided to the session management function (SMF), which allocates IP addresses and manages user sessions on the network. Depending on the construction of the 5G architecture, both UDM software and the UDR can send and store data. In a stateless network, user information is stored in the UDR, but the UDM function retrieves the data, sends it to other network functions, and generally manages it. The UDM can do this with many UDRs. The AMF receives user information sent through the network. The AMF then forwards the information to the SMF, which uses it to determine what session manager would be best assigned to the user. The SMF may be considered as a gateway from the user plane to the control plane of the network. The Policy Control Function (PCF) is one of the control plane network functions of the 5GC. The PCF provides policy rules for control plane functions, which include network slicing, roaming, and mobility management. The PCF may collect the subscriber metrics in context with their network, usage, applications.

As a mobile network operator (MNO) of a wireless telecommunication network grows and matures its network, it is advantageous to have a capability to be able to differentiate different portions of the network. For example, such portions may be defined by certain characteristics including, but not limited to: a voice certified (e.g., Voice over 5G New Radio (VoNR) certified) and commercially available network; a data certified and commercially available network; an un-launched and not commercially available network (for testing); portions of the network supported by certain RAN vendors. A voice certified network is a network, or portion of a network, that is designated by a certification authority (e.g., the MNO or other entity) as having sufficient capability and functionality for handling voice calls, whereas a data certified network is a network or portion of a network that is designated by a certification authority as having sufficient capability and functionality to provide data service to subscribers. Some of the above characteristics may overlap in various embodiments. In various embodiments, one or more of the above characteristics may be used to define technical access categories (TACs) for a portion of a network.

Furthermore, as an MNO introduces network markets or new sites within an existing market, it is advantageous for the MNO to be able to designate these new sites as participating in the above groups without any need to reprovision existing subscribers or provision new subscribers differently.

For example, in various embodiments, the during subscriber provisioning, the MNO is able to designate which portions of the network the subscriber should have access to via reference to groupings above, referred to herein as TACs. Traditionally, TACs are not being restricted and UEs are attaching to all cell sites, including those still under construction. However, the systems and methods described herein include restricting access to certain cell sites (cells) for certain devices during certain stages of the cell site's and/or market's development based on the TAC.

Certain devices or subscribers with certain characteristics may be restricted to access particular portions of the network based on those certain characteristics and the TAC the particular portion of the network is categorized in. For example, in various embodiments, the devices or subscribers with certain characteristics may be restricted to the particular portions of the network as follows: engineering test device with access to the entire network; data subscriber with access to data certified portions of the network; Dual SIM Dual Standby (DSDS) subscriber with access to data certified portions of the network; VoNR subscriber with access to VoNR certified portions of the network; subscriber with certain device types with access to certain portions of the network supported by specific RAN vendors. Other restrictions based on network and subscriber and/or UE characteristics may be implemented in various other embodiments.

As one example, currently when a radio tower is brought in service for testing and has not yet being certified, the MNO brings up this radio with reserved Mode −15. This means that subscriber can access the network only if they have Wireless Priority Service (WPS) service provisioned. Normal subscribers do not have WPS, so they will never access a RAN with reserved Mode −15. First responders usually have WPS provisioned, and they will be able to access a RAN under testing. As most of the commercial subscribers are without WPS, they will not be able to access the test network, they will not be latching to the RAN under testing. However, after the radio tower is certified, it is updated with reserved mode to be 0-9. Normal subscribers now can latch on to the normal subscription.

One solution includes international mobile subscriber identity (IMSI)-based provisioning in which TACs are loaded for each individual device based on market and testing needs. In this solution, when TACs change, the network must push a deregistration event to the device. This solution may work for market-based testing for specific devices, but it is not scalable for a commercial nationwide deployment.

As an improvement to the above solution, according to embodiments disclosed herein, the network (AMF) assigns cell sites to TACs in order to apply TAC restrictions. The network assigns one or more test TACs per market. Cells attach to the test TAC until they meet the Gate 7 requirements, then graduate to one of the production TACs. This results in no impact to UDM provisioning at the IMSI level and no changes to the device when the cell graduates to one of the production TACs.

FIG. 1 is a chart illustrating an example list of technical access categories (TACs) organized into groups and indicating which UE devices have access to cell cites categorized into the listed TACs based on device use in accordance with embodiments described herein.

As shown in FIG. 1, the network defines a TAC list 100 for each of the nine groups based on device (e.g., UE) use. In an example embodiment, the network assigns individual IMSIs into one and only one TAC group (provisioning of UDM). In various embodiments, a nationwide TAC list may be in the thousands. In an example embodiment, Use a service area ID is used to represent a market (e.g., in 3G and 4G deployed solution).

FIGS. 2A and 2B show a chart illustrating identified shared data sets associated with categories of UEs with example use cases of which portions of the network those categories of UEs have access to according to a TAC designated for cell sites providing those portions of the network in accordance with embodiments described herein. For example, UEs is the category "Vendor A Engineering test UEs" share "Vendor A Shared AM Data Profile 1", are restricted from access to cell sites in the TAC Set 4 category of "Vendor B VoNR RAN", the TAC Set 5 category of "Vendor B RAN" and the TAC Set 6 category of "Vendor B Unlaunched RAN" but are allowed access to cell sites in the other TACs listed (i.e., those for Vendor A). TAC Set1, set2, set3 are Mavenir RAN and Set4, 5, 6 are Samsung. Specific TACs. In an example embodiment, any TACs set/number would exist only in one of these sets shown in the chart 200. In one example, when shared data clashes with individual data, individual data shall take precedence as default treatment unless the feature SharedDataTreatment is supported and the SharedData contains treatment instructions different from the default treatment.

Figure 3B:
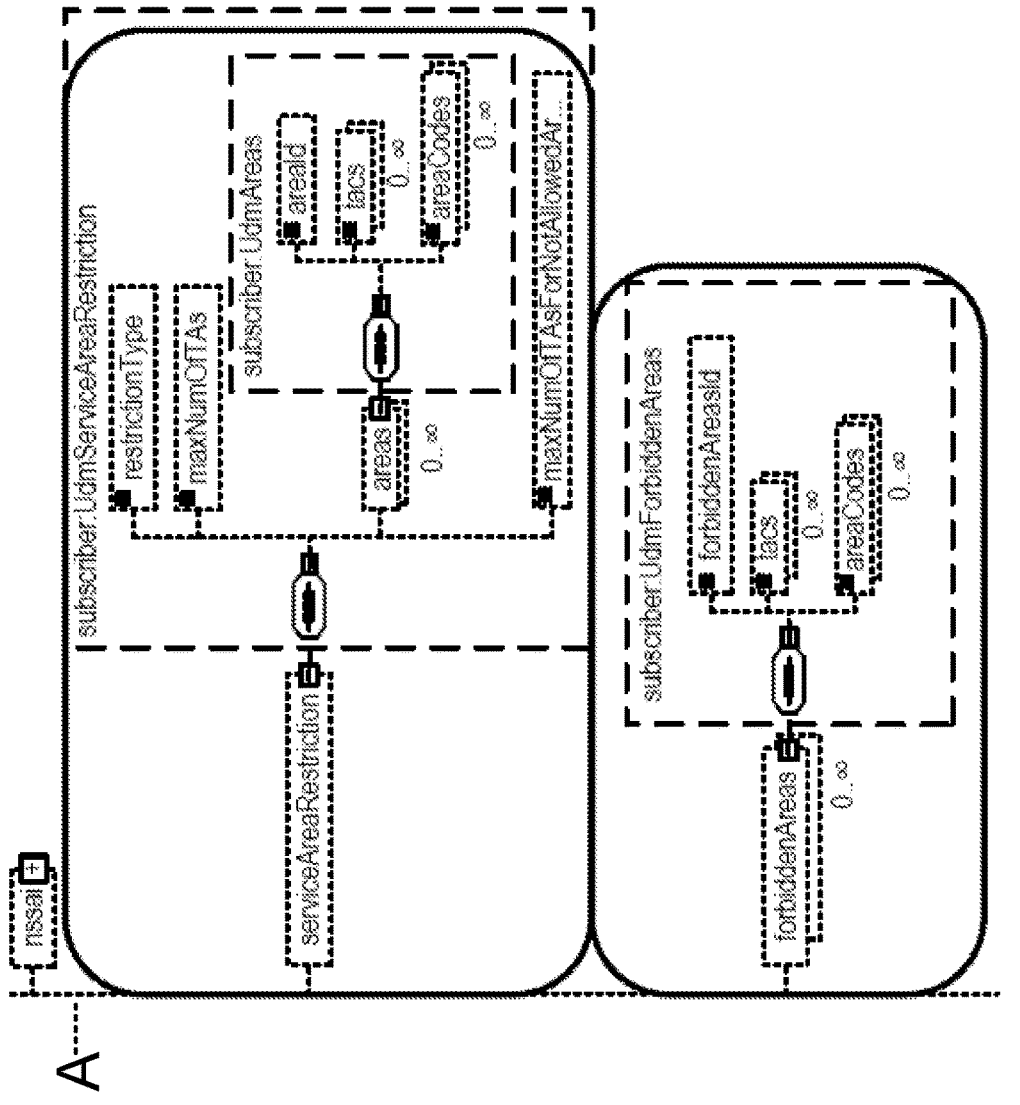

FIGS. 3A and 3B illustrate an example of how a subscriber profile update 300 may work using shared data sets in an example implementation of restricting user UE access to certain cell sites in the network in accordance with embodiments described herein. In one example embodiment, in UDM/UDR, the system performs subscriber profile update serviceAreaRestriction or Forbidden AREAs, preferably to use Shared Data. Shared Data sets SharedAMData may be used. Shared Data with configured serviceAreaRestriction or Forbidden AREAs and TACs may be used. Subscribers may be configured with particular SharedAMData profile.

FIGS. 4A and 4B illustrate an example data structure 400 for shared data indicating service area restriction and forbidden area for subscribers in an example implementation of restricting UE access to certain cell sites in the network in accordance with embodiments described herein. Shown is an example of utilizing SharedAMData and accessAndMobilitySubscriptionData contained therein for indicating service area restriction and forbidden area and indicating TACs using such data maintained in the network.

Figure 5A:
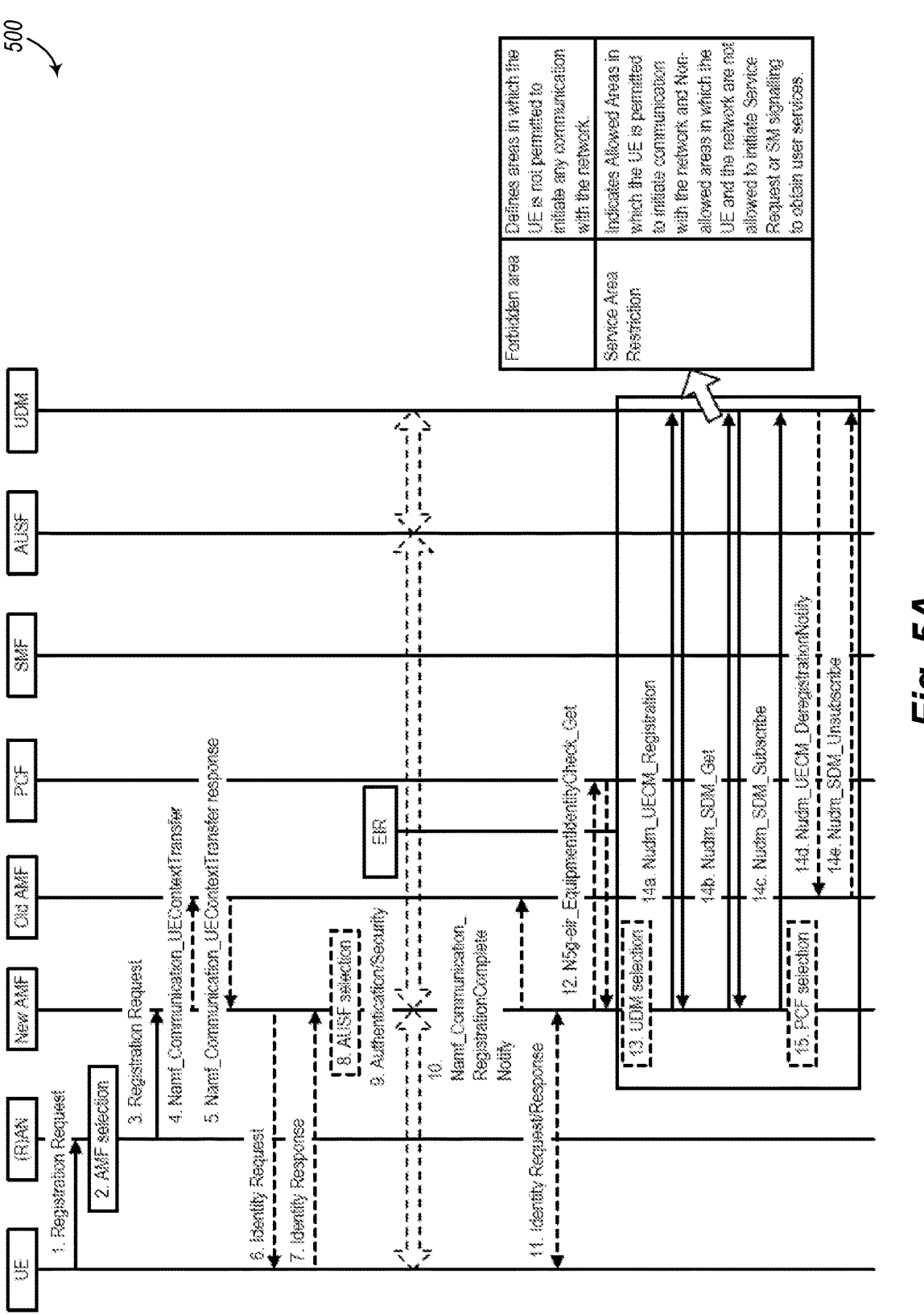
FIGS. 5A and 5B illustrate an example sequence diagram illustrating example implementation details of an example process for provisioning a UE in an example implementation of restricting UE access to certain cell sites in the network in accordance with embodiments described herein.
Figure 5B:
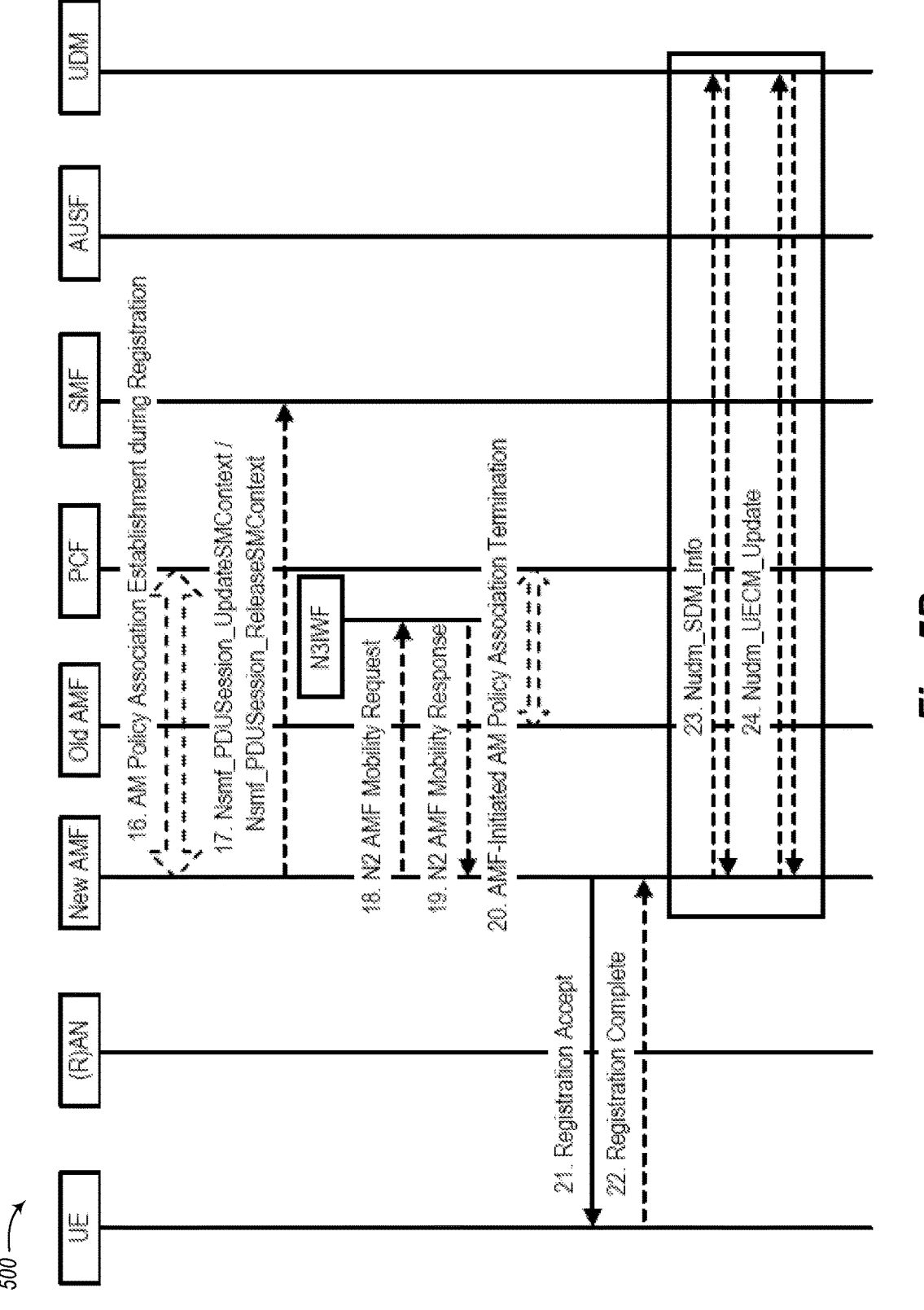

FIGS. 5A and 5B illustrate an example sequence diagram 500 illustrating example implementation details of an example process for provisioning a UE in an example implementation of restricting UE access to certain cell sites in the network in accordance with embodiments described herein. Shown are example actions occurring at and/or between the UE, RAN, New AMF, Old AMF, PCF, SMF, Authentication Server Function (AUSF) and UDM in an example wireless telecommunication network for provisioning the UE in an example implementation of restricting UE access to certain cell sites in the network.

FIG. 6 illustrates a logical flow diagram showing an example embodiment of a process 600 for restricting UE access to certain cell sites in the network in accordance with embodiments described herein in accordance with embodiments described herein.

At 602 the system categorizes each cell site of a plurality of cell sites in the network into at least one respective technical access category (TAC) of a plurality of TACs. The plurality of TACs may include one or more TACs indicating one or more characteristics of a portion of a network provided by a cell site. The characteristics of a portion of a network provided by a cell site include, but are not limited to, one or more of: voice certified and commercially available network; data certified and commercially available network; un-launched and not commercially available network that is for testing only; and portion of the network supported by a certain radio access network vendor.

At 604, for each user equipment device (UE) of a plurality of UEs, the system restricts access of the UE to particular cell sites of the network based on respective TACs of the particular cell sites. The restricting access of the UE to particular cell sites may also be based on characteristics of the UE or a subscriber associated with the UE. The characteristics of the UE or a subscriber associated with the UE may include, but are not limited to, one or more of: engineering test device with access to an entirety of the network; data subscriber with access to data certified portions of the network; voice service subscriber with access to voice certified portions of the network; subscriber with certain device types with access to certain portions of the network. In one example, the characteristics of the UE or a subscriber associated with the UE includes whether the subscriber has Wireless Priority Service (WPS) provisioned and a respective TAC of the particular cell site indicates the cell site has been brought in service for testing, but is not yet certified.

In an example embodiment, the system may electronically categorize new cell sites in the network into a TAC without re-provisioning existing subscribers on the network and without provisioning new subscribers on the network differently than how subscribers were provisioned previously on the network other than designating which portions of the network the new subscribers have access to via reference to one or more TACs of the plurality of TACs.

FIG. 7 illustrates a logical flow diagram 700 showing an example embodiment of a process for restricting UE access to certain cell sites in the network involving designating which portions of the network the subscriber has access to in accordance with embodiments described herein in accordance with embodiments described herein.

At 702, during provisioning of UEs of each subscriber of a plurality of subscribers on the network, the system electronically designates which portions of the network the subscriber has access to via reference to one or more TACs of the plurality of TACs.

At 704, the system electronically restricts access of the subscriber to particular portions of the network based on the designation without re-provisioning the UEs.

FIG. 8 illustrates a logical flow diagram showing an example embodiment of a process 800 for restricting UE access to certain cell sites in the network involving changing categorization of one or more cell sites of the plurality of cell sites into a different TAC in accordance with embodiments described herein in accordance with embodiments described herein.

At 802, the system electronically changes categorization of one or more cell sites of the plurality of cell sites into a different TAC.

At 804, the system automatically changes access of one or more UEs on the network to portions of the network based on the changed categorization of one or more cell sites of the plurality of cell sites into a different TAC without re-provisioning existing subscribers associated with the one or more UEs.

Figure 9:
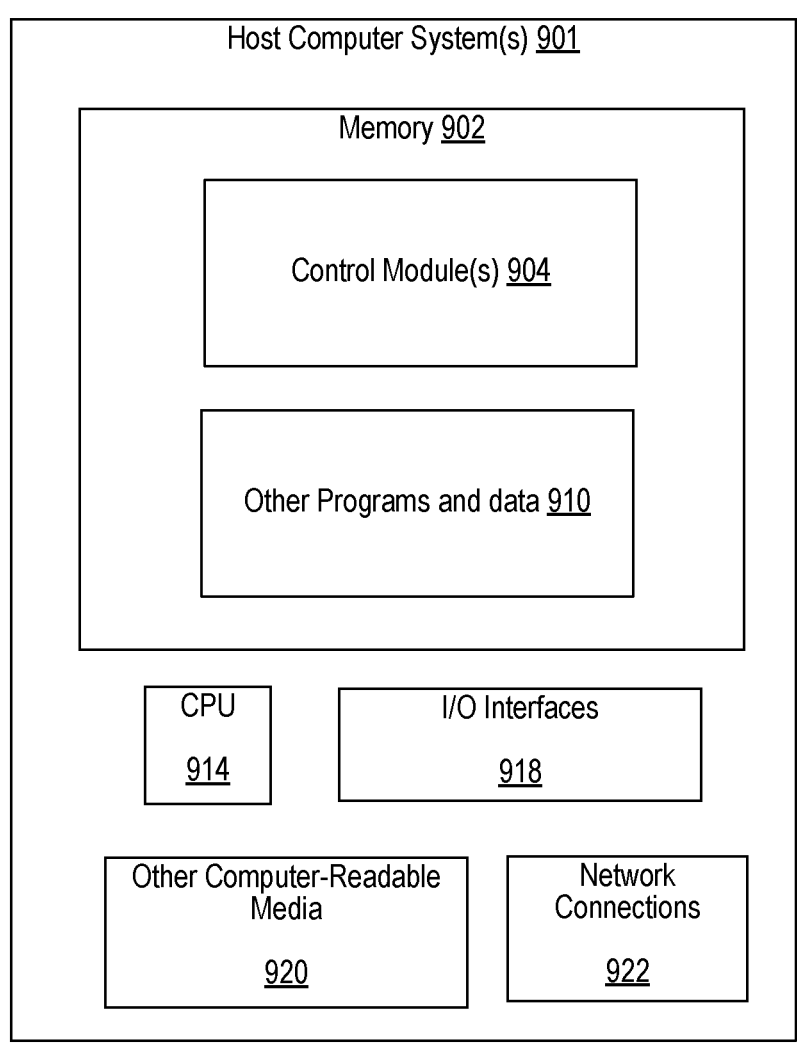
FIG. 9 shows a system diagram that describes an example implementation of a computing system(s) for implementing embodiments described herein.

FIG. 9 shows a system diagram that describes an example implementation of a computing system(s) for implementing embodiments described herein.

The functionality described herein for restricting UE access to certain cell sites in the network can be implemented either on dedicated hardware, as a software instance running on dedicated hardware, or as a virtualized function instantiated on an appropriate platform, e.g., a cloud infrastructure. In some embodiments, such functionality may be completely software-based and designed as cloud-native, meaning that they are agnostic to the underlying cloud infrastructure, allowing higher deployment agility and flexibility. However, FIG. 9 illustrates an example of underlying hardware on which such software and functionality may be hosted and/or implemented.

In particular, shown is example host computer system(s) 901. For example, such computer system(s) 901 may represent one or more of those in various data centers, base stations and cell sites shown and/or described herein that are, or that host or implement the functions of: routers, components, microservices, nodes, node groups, control planes, clusters, virtual machines, network functions (NFs), intelligence layers, orchestrators and/or other aspects described herein, as applicable, for restricting UE access to certain cell sites in the network. In some embodiments, one or more special-purpose computing systems may be used to implement the functionality described herein. Accordingly, various embodiments described herein may be implemented in software, hardware, firmware, or in some combination thereof. Host computer system(s) 901 may include memory 902, one or more central processing units (CPUs) 914, I/O interfaces 918, other computer-readable media 920, and network connections 922.

Memory 902 may include one or more various types of non-volatile and/or volatile storage technologies. Examples of memory 902 may include, but are not limited to, flash memory, hard disk drives, optical drives, solid-state drives, various types of random access memory (RAM), various types of read-only memory (ROM), neural networks, other computer-readable storage media (also referred to as processor-readable storage media), or the like, or any combination thereof. Memory 902 may be utilized to store information, including computer-readable instructions that are utilized by CPU 914 to perform actions, including those of embodiments described herein.

Memory 902 may have stored thereon control module(s) 904. The control module(s) 904 may be configured to implement and/or perform some or all of the functions of the systems, components and modules described herein for restricting UE access to certain cell sites in the network. Memory 902 may also store other programs and data 910, which may include rules, databases, application programming interfaces (APIs), software containers, nodes, pods, clusters, node groups, control planes, software defined data centers (SDDCs), microservices, virtualized environments, software platforms, cloud computing service software, network management software, network orchestrator software, intelligence layer software, network functions (NF), artificial intelligence (AI) or machine learning (ML) programs or models to perform the functionality described herein, user interfaces, operating systems, other network management functions, other NFs, etc.

Network connections 922 are configured to communicate with other computing devices to facilitate the functionality described herein. In various embodiments, the network connections 922 include transmitters and receivers (not illustrated), cellular telecommunication network equipment and interfaces, and/or other computer network equipment and interfaces to send and receive data as described herein, such as to send and receive instructions, commands and data to implement the processes described herein. I/O interfaces 918 may include video interfaces, other data input or output interfaces, or the like. Other computer-readable media 920 may include other types of stationary or removable computer-readable media, such as removable flash drives, external hard drives, or the like.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method in a wireless telecommunication network for restricting user equipment (UE) access to certain cellular (cell) sites in the network, the method comprising:
    categorizing each cell site of a plurality of cell sites in the network into at least one respective technical access category (TAC) of a plurality of TACs; and
    for each user equipment device (UE) of a plurality of UEs, restricting access of the UE to particular cell sites of the network based on respective TACs of the particular cell sites;
    electronically changing categorization of one or more cell sites of the plurality of cell sites into a different TAC; and
    automatically changing access of one or more UEs on the network to portions of the network based on the changed categorization of one or more cell sites of the plurality of cell sites into a different TAC without re-provisioning existing subscribers associated with the one or more UEs.

2. The method of claim 1, wherein the restricting access of the UE to particular cell sites of the network includes:
    during provisioning of UEs of each subscriber of a plurality of subscribers on the network, electronically designating which portions of the network the subscriber has access to via reference to one or more TACs of the plurality of TACs; and
    electronically restricting access of the subscriber to particular portions of the network based on the designation without re-provisioning the UEs.

3. The method of claim 1, further comprising:
    electronically categorizing new cell sites in the network into a TAC without re-provisioning existing subscribers on the network and without provisioning new subscribers on the network differently than how subscribers were provisioned previously on the network other than designating which portions of the network the new subscribers have access to via reference to one or more TACs of the plurality of TACs.

4. The method of claim 1 wherein the plurality of TACs include one or more TACs indicating one or more characteristics of a portion of a network provided by a cell site.

5. The method of claim 4 wherein the one or more characteristics of a portion of a network provided by a cell site include one or more of: voice certified and commercially available network; data certified and commercially available network; un-launched and not commercially available network that is for testing only; and portion of the network supported by a certain radio access network vendor.

6. The method of claim 1 wherein the restricting access of the UE to particular cell sites is also based on characteristics of the UE or a subscriber associated with the UE.

7. The method of claim 6 wherein the characteristics of the UE or a subscriber associated with the UE include one or more of: engineering test device with access to an entirety of the network; data subscriber with access to data certified portions of the network; voice service subscriber with access to voice certified portions of the network; subscriber with certain device types with access to certain portions of the network.

8. The method of claim 6 wherein the characteristics of the UE or a subscriber associated with the UE includes whether the subscriber has Wireless Priority Service (WPS) provisioned and a respective TAC of the particular cell sites indicates the cell site has been brought in service for testing, but is not yet certified.

9. A system for a wireless telecommunication network for restricting user equipment (UE) access to certain cellular (cell) sites in the network, the system comprising:
    at least one processor; and
    at least one memory coupled to the at least one processor having computer-executable instructions stored thereon which, when executed by the at least one processor, cause operations to be performed, the operations including:
        categorizing each cell site of a plurality of cell sites in the network into at least one respective technical access category (TAC) of a plurality of TACs; and
        for each user equipment device (UE) of a plurality of UEs, restricting access of the UE to particular cell sites of the network based on respective TACs of the particular cell sites.

10. The system of claim 9, wherein the restricting access of the UE to particular cell sites of the network includes:
    during provisioning of UEs of each subscriber of a plurality of subscribers on the network, electronically designating which portions of the network the subscriber has access to via reference to one or more TACs of the plurality of TACs; and
    electronically restricting access of the subscriber to particular portions of the network based on the designation without re-provisioning the UEs;
    electronically changing categorization of one or more cell sites of the plurality of cell sites into a different TAC; and
    automatically changing access of one or more UEs on the network to portions of the network based on the changed categorization of one or more cell sites of the plurality of cell sites into a different TAC without re-provisioning existing subscribers associated with the one or more UEs.

11. The system of claim 9, wherein the operations further include:

electronically categorizing new cell sites in the network into a TAC without re-provisioning existing subscribers on the network and without provisioning new subscribers on the network differently than how subscribers were provisioned previously on the network other than designating which portions of the network the new subscribers have access to via reference to one or more TACs of the plurality of TACs.

12. The system of claim 9 wherein the plurality of TACs include one or more TACs indicating one or more characteristics of a portion of a network provided by a cell site.

13. A non-transitory computer-readable storage medium having computer-executable instructions stored thereon which, when executed by at least one processor, cause operations to be performed for a wireless telecommunication network for restricting user equipment (UE) access to certain cellular (cell) sites in the network, the operations including:

categorizing each cell site of a plurality of cell sites in the network into at least one respective technical access category (TAC) of a plurality of TACs; and for each user equipment device (UE) of a plurality of UEs, restricting access of the UE to particular cell sites of the network based on respective TACs of the particular cell sites;

electronically changing categorization of one or more cell sites of the plurality of cell sites into a different TAC; and automatically changing access of one or more UEs on the network to portions of the network based on the changed categorization of one or more cell sites of the plurality of cell sites into a different TAC without re-provisioning existing subscribers associated with the one or more UEs.

14. The non-transitory computer-readable storage medium of claim 13, wherein the restricting access of the UE to particular cell sites of the network includes:

during provisioning of UEs of each subscriber of a plurality of subscribers on the network, electronically designating which portions of the network the subscriber has access to via reference to one or more TACs of the plurality of TACs; and electronically restricting access of the subscriber to particular portions of the network based on the designation without re-provisioning the UEs.

15. The non-transitory computer-readable storage medium of claim 13, wherein the operations further include:

electronically categorizing new cell sites in the network into a TAC without re-provisioning existing subscribers on the network and without provisioning new subscribers on the network differently than how subscribers were provisioned previously on the network other than designating which portions of the network the new subscribers have access to via reference to one or more TACs of the plurality of TACs.

16. The non-transitory computer-readable storage medium of claim 13 wherein the plurality of TACs include one or more TACs indicating one or more characteristics of a portion of a network provided by a cell site.

17. The non-transitory computer-readable storage medium of claim 16 wherein the one or more characteristics of a portion of a network provided by a cell site include one or more of: voice certified and commercially available network; data certified and commercially available network; un-launched and not commercially available network that is for testing only; and portion of the network supported by a certain radio access network vendor.

* * * * *